United States Patent [19]
Li et al.

[11] Patent Number: 5,532,856
[45] Date of Patent: Jul. 2, 1996

[54] PLANAR OPTICAL MESH-CONNECTED TREE INTERCONNECT NETWORK

[75] Inventors: Yao Li, Monmouth Junction; Richard A. Linke, Princeton; Yuh-Dauh Lyuu, Cranbury, all of N.J.; Kenichi Kasahara, Ibaraki, Japan; Shigeru Kawai, Tokyo, Japan; Keiichi Kubota, Kanagawa, Japan

[73] Assignee: NEC Research Institute, Inc., Princeton, N.J.

[21] Appl. No.: 269,913

[22] Filed: Jun. 30, 1994

[51] Int. Cl.$^6$ .............................. H04B 10/20; H04J 14/00
[52] U.S. Cl. ........................ 359/118; 359/152; 364/713
[58] Field of Search ................................ 359/109, 118, 359/130, 152, 154, 163; 364/713

[56] References Cited

U.S. PATENT DOCUMENTS

| 5,315,425 | 5/1994 | van Deventer et al. | 359/153 |
| 5,351,146 | 9/1994 | Chan et al. | 359/118 |

OTHER PUBLICATIONS

Jurgen Jahns, et al "Integrated planar optical imaging system with high interconnection density", Optics Letters, vol. 18, No. 19 pp. 1594–1596, Oct. 1993.

Michael R. Feldman et al, "Holographic Optical Interconnects for VLSI Multichip Modules", 42nd Electronic Components and Technology Conf, 1992 (IEEE) vol. 1, pp. 513–518.

Dhruva Nath, et al "Efficient VLSI Networks for Parallel Processing Based on Orthogonal Trees," IEEE Trans. Comput. C–32, pp. 569–581, 1983.

J. Jahns et al "Planar Integration of free–space optical components", Applied Optics, vol. 28, No. 9 pp. 1602–1605, 1989.

Richard A. Linke, "Power Distribution in a Planar–Waveguide–Based Broadcast Star Network", IEEE Photon. Tech. Lett., vol. 3, No. 9 pp. 850–852, 1991.

Shigeru Kawai et al, "Two–Dimensional Optical Buses for Massively Parallel Processing," Optical Computing vol. 6, pp. 136–139, 1991.

Kenichi Kasahara, et al "VSTEP–Based Smart Pixels", IEEE Quantum Electron vol. 29, No. 2, pp. 757–768, Feb. 1993.

Jack L. Jewell, et al "Vertical–Cavity Surface–Emitting Lasers: Design, Growth, Fabrication, Characterization," IEEE J. Quantum Electron, vol. 27, pp. 1332–1346, 1991.

J. E. Morris et al "Prototype Optically Interconnected Multichip Module based on Computer Generated Hologram Technology".

*Primary Examiner*—Leo Boudreau
*Assistant Examiner*—Kinfe-Michael Negash
*Attorney, Agent, or Firm*—Philip J. Feig

[57] ABSTRACT

A mesh-connected tree (MCT) interconnect topology network which is a two-dimensional interconnect topology combining aspects of a conventional tree-network and a two-dimensional nearest-neighbor mesh network is implemented as a planar optical interconnect network.

20 Claims, 10 Drawing Sheets

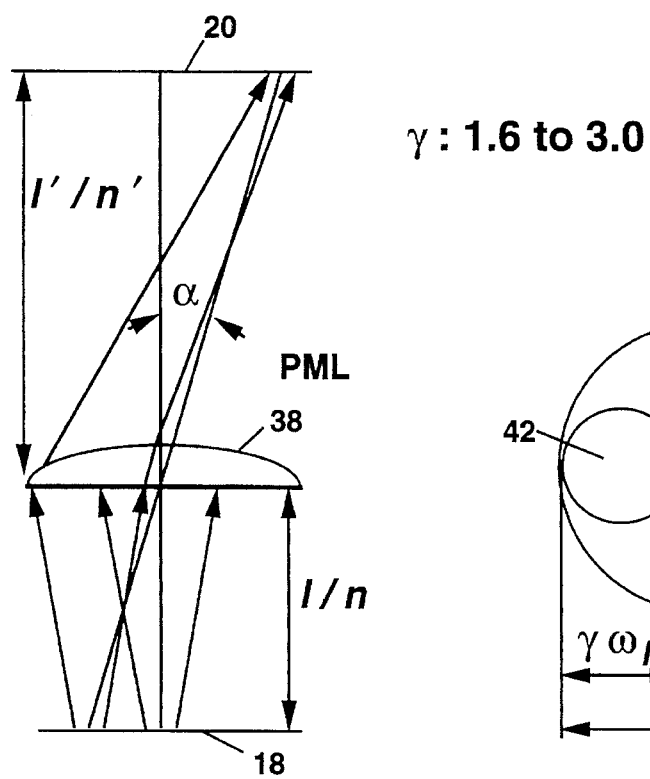
γ : 1.6 to 3.0
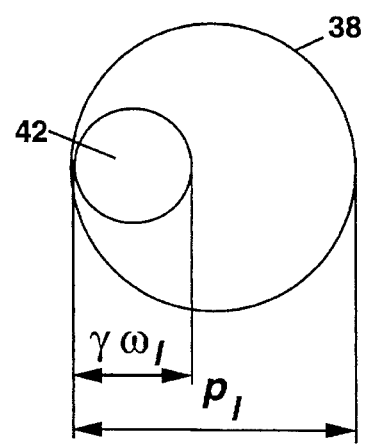
Figure 7a
Figure 7b
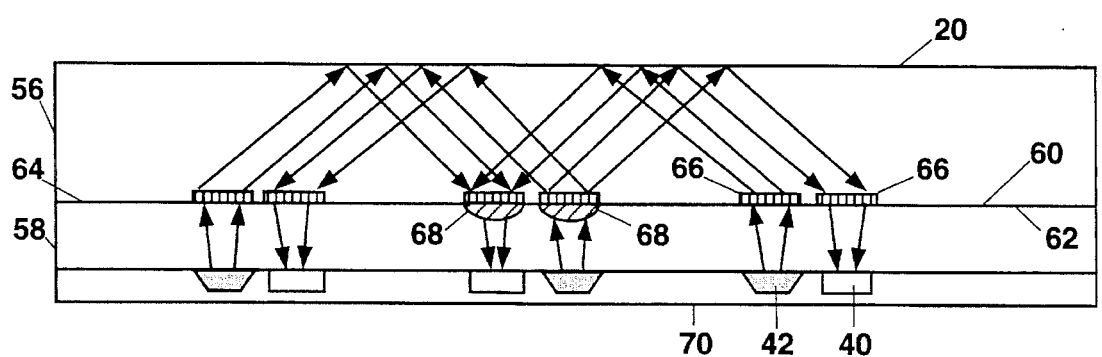
Figure 12

PLANAR OPTICAL MESH-CONNECTED TREE INTERCONNECT NETWORK

FIELD OF THE INVENTION

This present invention relates to planar optical mesh-connected tree (MCT) interconnect topology networks.

BACKGROUND OF THE INVENTION

The advantages of optics for information transmission are generally well-known. Optics can provide more capacity and flexibility for large bandwidth communication than is achievable by using solely electronic components. The successful application of fiber optics demonstrates the advantages of optics for long-distance and wide-bandwidth telecommunication. As communication distance decreases and the number of communicating nodes simultaneously increases, there is a gradual shift from a telecommunication domain to an interconnection domain where typical applications are inter-and intra-computer communications. For the latter applications, low loss fibers become less critical components since free-space optics can provide comparable loss characteristics.

The use of free-space optics results in additional degrees of freedom since optical beams can be directed to traverse three-dimensional (3D) space system instead of being confined to a one-dimensional (1D) waveguide, such as a fiber.

Recent advances in developing micro-optic components has enabled progress in planar quasi-3D optical packaging for opto-electronic information processing systems. The flexibility to manipulate optical signals in the quasi-3D space provided by the planar optical geometry is not as good as that obtainable in a true 3D volume. However, the quasi-3D space system is more flexible than that achievable in a 1D waveguide or in a fiber. The quasi-3D systems offer more rigidity than that of a true free-space system. Schemes for performing optical signal distributions based on planar optics are described in an article by J. Jahns and A. Huang entitled "Planar Integration of Free-Space-Optical components" in Applied Optics, volume 28, pages 1602–1605, 1989. For performing more complicated operations, wavelength-division multiplexed (WDM) interconnects were proposed in an article by R. Linke entitled "Power Distribution in a Planar-waveguide-based Broadcast Star Network" in IEEE Photon. Tech. Lett., vol 3, pages 850 to 852, 1991 and in an article by S. Kawai and M. Mizoguchi entitled "Two-Dimensional Optical Buses for Massively Parallel Processing" in Optical Computing, vol 6, 1991, Technical Digest Series, at pages 136 to 139. Due to distribution loss and the complexity of the WDM device involved, the number of interconnecting nodes is very limited. It has also been suggested that a quasi-planar optical layout might be useful for relaying signals in a multistage network in an article by J. Jahns and B. Acklin entitled "Integrated Planar Optical Imaging System with High Interconnection Density" in Optics Letters, vol. 18, pages 1594 to 1596, October 1993 and by M. R. Feldman et al. entitled "Holographic Optical Interconnects for VLSI Multiclip Modules" in 42nd Electronic Components and Technology Conference 1992 (IEEE) vol. 1, pages 513 to 518. However, these schemes each require additional interconnects between stacks of such planar modules, making the design, fabrication, and alignment a very difficult task. A multistage network for a planar optical network implementation is described in an article by D. Nath et al. entitled "Efficient VLSI Networks for Parallel Processing Based on Orthogonal Trees", in IEEE Trans. Comput. C-32, pages 569–581, 1983.

In general, there are two important network parameters, the diameter of a network and the bisection-width of a network. The diameter of a network is the maximum distance between any pair of processors where the distance between a pair of processors is the minimum number of wires that must be traversed to travel from one processor to the other processor. The bisection-width of a network is the minimum number of wires that must be removed to separate the network into two halves with identical (within a difference of one processor) numbers of processors.

The simplest network of a set of N computers or processors is a ring. There are two major drawbacks associated with a ring. First, a ring has a large diameter so the number of hops between two processors is N in a worst case scenario. Second, a ring has a small bisection width since only two nodes need to be removed in order to divide the network into two equal halves. Therefore, a ring is slow in terms of message passing speed and has a small bandwidth.

Performance can be improved by adding more switching complexity to the network. In order to increase the speed, a tree structure can be used, thereby reducing the network diameter by a factor of $(\log_2 N)/N$ or simply $O[\log(n)/N]$. The symbol $O(\bigcirc)$ refers to the complexity or upper bound of the asymptotic behavior of network. However, the bisection width of the tree topology remains small. Alternatively, in order to increase the capacity, i.e. to enlarge the bisection width, the connectivity must be increased. Similar to a ring, a nearest-neighbor rectangular mesh is a 2D version of a ring, but has a per-node connectivity two times larger than a single ring. A mesh is known to have a bisection width of $\sqrt{N}$ since $\sqrt{N}$ wires must be cut in order to decompose a mesh into two smaller but equal size meshes. The diameter of a mesh is also $\sqrt{N}$, making a mesh a faster network than a ring but a slower network than a tree.

Almost all presently existing quasi-planar optical interconnection schemes rely upon multiple beam reflections inside the planar cavity. That is, in addition to the top reflecting plane, a portion of the bottom plane has to be used to reflect optical signals. Thus, the bottom surface has to be partitioned to interlace both the transmitting and reflecting components, thereby making fabrication and alignment even more difficult. In addition, as a result of using an extremely limited vertical dimension in planar optics, coupled with the limited field-of-view of manufacturable optical components, the required multiple reflections in many proposed interconnect schemes seriously limits the ratio of the active component area to the passive component area.

SUMMARY OF THE INVENTION

In contrast to most existing arrangements, the present invention relies on a single reflection for any signal to reach its destination. All reflections occur at a mirrored reflecting plane at one surface of the waveguide and the oppositely disposed parallel plane of the waveguide, instead being another reflecting plane, contains transmitting components. Therefore, for a given total area, the present invention provides for many more interconnecting nodes. The use of a single reflection between a transmitter and a receiver also effectively reduces fabrication and alignment difficulty and increases the corresponding fault tolerance, which is an important practical consideration for enhancing use of the invention. Using this criteria, the disclosed MCT network performs favorably when compared with most other existing planar optical interconnect schemes.

A goal of network communication is to define a network which has both a small diameter and a large bisection width. Such networks exist but at a price of having to use a large quantity of switches, thus requiring more power consumption and higher cost. A combination of a tree topology and a mesh topology results in a hybrid interconnect, the mesh-connected tree (MCT) topology. Orthogonal tree topology is described, for example, in the article by D. Nath et al. supra.

A limitation of the MCT topology is that although the MCT topology is an area-efficient layout, it is difficult to physically implement using planar electronic packaging technology commonly in use today. Unlike a conventional mesh where interconnecting means between processors never have to intersect one another, the MCT topology requires multilayer packaging since row and column trees pass across one another. In order to solve this problem, the present invention relies upon optical technology as an alternative technology in order to obviate the wire intersection problem. Optical signals are able to intersect one another in an optically linear medium without interaction.

In accordance with the teachings of the present invention, a mesh-connected tree (MCT) network topology is the preferred planar optical implementation. In particular, a vertical-to-surface-transmission-electro-photonic (VSTEP) device or a vertical cavity surface emitting laser (VCSEL) and a planar array of passive micro-optical components form the basic building blocks for an opto-electronic MCT network implementation. VSTEP devices are described in an article by K. Kasahara entitled "VSTEP-Based Smart Pixels," in IEEE J. Quantran Electron. vol. 29, no. 2, pp. 757–768, February 1993. VCSEL lasers are described in an article by J. L. Jewelll et al. entitled "Vertical-Cavity Surface-emitting Lasers: Design, Growth, Fabrication, Characterization," in IEEE J. Quantran Electron., vol. 27, pp. 1332–1346, 1989.

A principal object of the present invention is therefore, the provision of a planar optical mesh-connected tree topology interconnect network.

Another object of the present invention is the provision of vertical cavity surface emitting lasers (VCSEL) or vertical cavity vertical-to-surface-transmission-electro-photonic (VSTEP) device in such a planar optical mesh-connected tree topology interconnect network.

A further object of the present invention is the use of a combination of a VCSEL or VSTEP laser and a planar array of passive micro-optical components in a planar optical mesh-connected tree topology interconnect network.

Further and still other objects of the present invention will become more clearly apparent when the following description is read in conjunction with the accompanying drawing.

BRIEF DESCRIPTION OF THE DRAWING

FIG. 7a is a representation of a geometry for performing imaging and deflection with a planar microlens (PML);

FIG. 7b shows the relationship of the PML and a transmitter for off-axis imaging;

FIG. 12 is a cross-section profile of a preferred planar optical network using only type II components fabricated on both the upper and lower transparent optical flats.

DETAILED DESCRIPTION

In order to better understand the concept of a planar optical MCT network, a general background of MCT topology will be provided.

Figure 1:
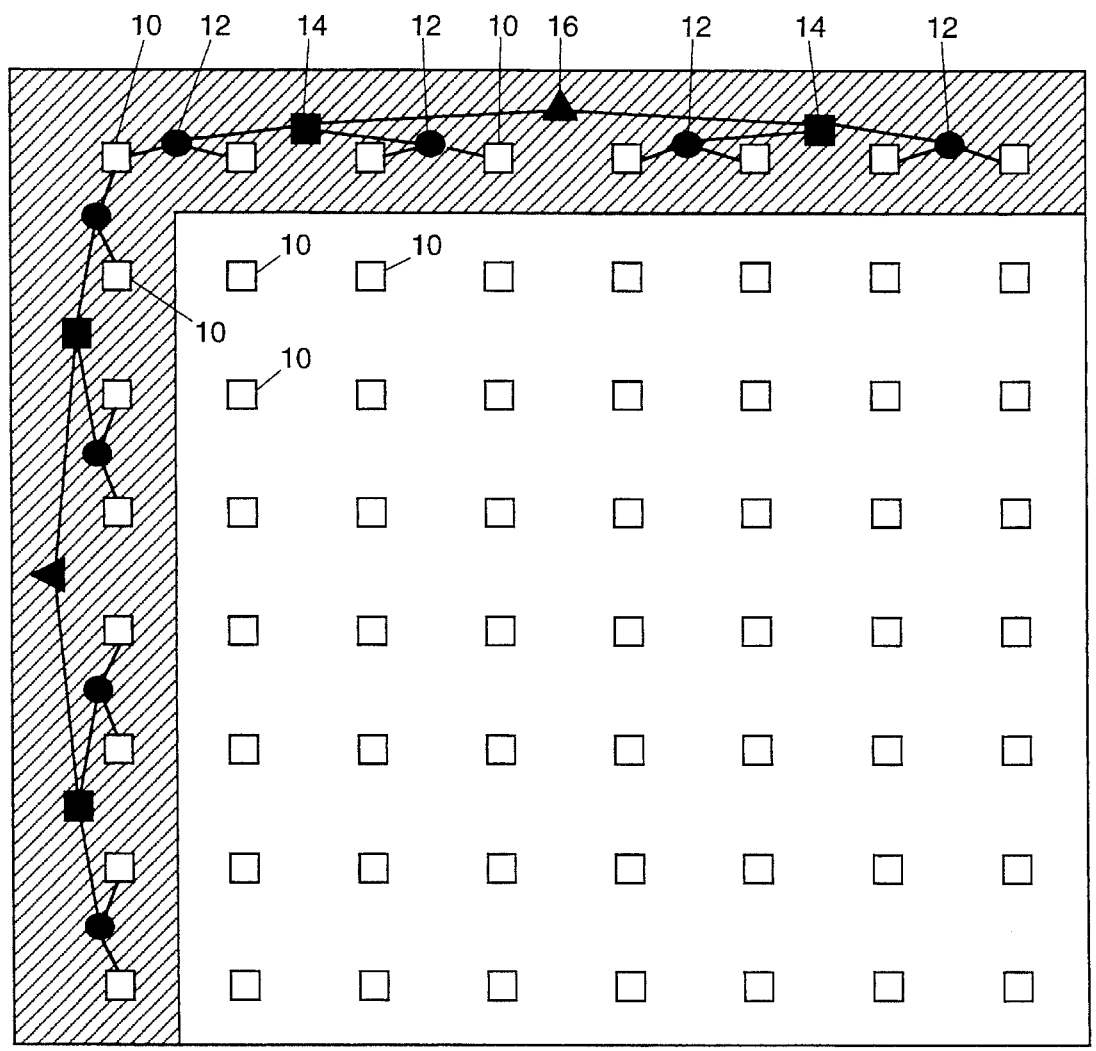
FIG. 1 is a topological layout of a 64-node mesh-connected tree interconnect network.

Referring now to the figures and to FIG. 1 in particular, there is shown a topological layout of a 64-node mesh-connected interconnect network of computers or processors. Since the linking strategy for each row or column is the same in a simple tree configuration, only the connection pattern of the first row and the first column is shown. The connection pattern is repeated for each row and colmnn of the network. Each of the 64 leaf nodes 10 is connected to a computer or processor. The other nodes 12, 14, 16 represent additional switches used for relaying purposes. The diameter of the MCT network is O(logN), same as that of a tree. The bisection width is $\sqrt{N}$ which is the same as that of a mesh and is much larger than that of a tree. A total of $3N-2\sqrt{N}$ nodes (including the original N leaf node switches) are used to obtain this performance enhancement. Although $2N-2\sqrt{N}$ additional relaying nodes are used, the MCT uses fewer additional nodes than are used in a multistage interconnect, which typically contains (N–1) log N additional nodes.

Figure 2:
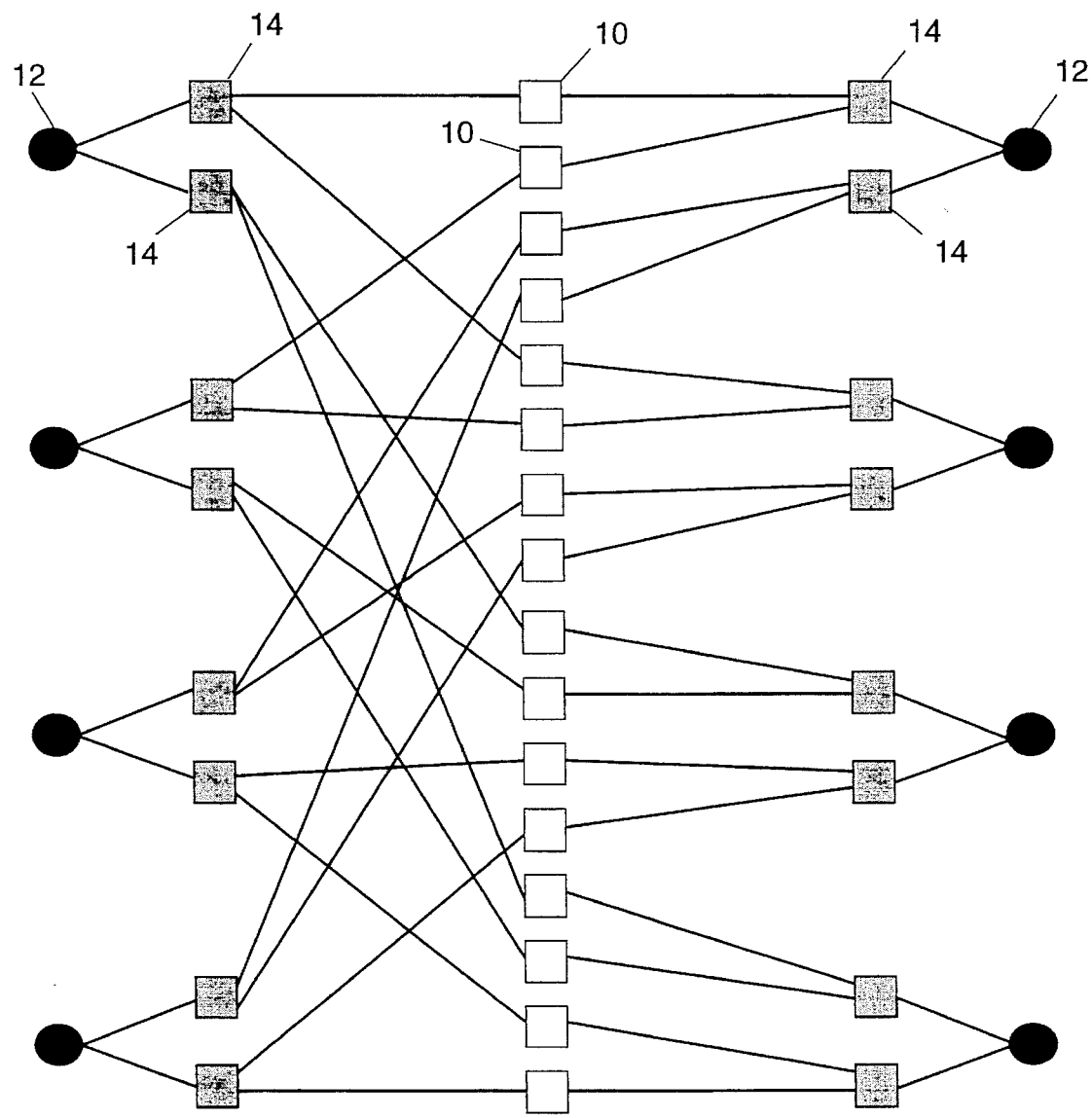
FIG. 2 is a remapped MCT topology layout.

It is known that by topologically rearranging nodes a MCT network can be used as a completely connected network to link processors with their memory. In FIG. 2, root nodes 12 are used as I/O nodes linking processors to memory. Sixteen leaf nodes 10 and sixteen other nodes 14 represent switches handling interconnection. Although this configuration is not very efficient in terms of complexity, it does allow powerful interconnections (similar to a cross-bar) to be achieved. It will be apparent to those skilled in the art that the two dimensional MCT topology concept can be extended to a multidimensional topology. For example, a 3D MCT network has been described in a doctorial thesis by F. T. Leighton entitled "Layouts for the Shuffle-Exchange Graph and Lower Bound Techniques for VLSI, MIT, 1981. The present invention of optical implementation of an MCT network will be described in conjunction with the 2D topology.

MCT topology is known to perform certain operations in a superior manner to either a mesh or a tree. Typical operations which are advantageously performed in MCT networks include integer computations, matrix inversion, convolution, multiplication and division operation. MCT topology is also known to be efficient for graph algorithms.

Figure 3A:
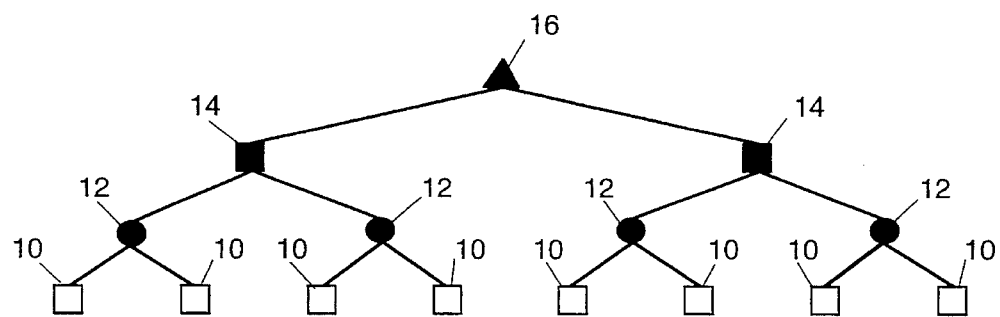
FIG. 3a illustrates a conventional binary tree connection.
Figure 3B:
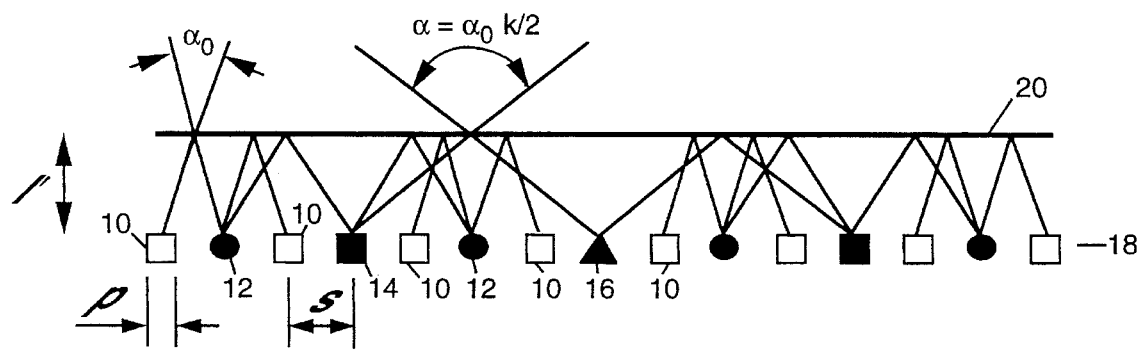
FIG. 3b illustrates a compressed binary tree formed by locating the switching nodes at locations between leaf nodes.

A limitation of MCT topology is that while being an area-efficient layout, it is difficult to physically implement using planar electronic packaging technology. In considering an optical MCT implementation, FIG. 3(a) shows a binary tree structure containing eight leaf nodes 10 and several additional nodes. Each intermediate node 12, 14 links two "child" nodes below and a "parent" node above. This pattern is repeated for all nodes except for the leaf nodes 10 and the common root node 16. Thus, the degree or fan-out of a true node is a maximum of three. All non-leaf nodes can be compressed to the same plane as the leaf node with each non-leaf node being located at a midpoint between two adjacent leaf nodes as shown in FIG. 3(b). The connections between nodes can be conceptualized as optical beams.

A single plane reflector 20 is shown in parallel to the node splitting plane 18 comprising a linear array of nodes 10, 12, 14 and 16. The linear dimension of a node is p and the spacing between adjacent nodes is s. The angles $\alpha$ and $\alpha_0$ are the largest and smallest angles, respectively, required to transmit an optical signal from a given transmitter to its known destination receiver with only a single reflection at plane reflector 20. The distance l' is the distance between the node splitting plane 18 and the plane reflector 20.

Since both the optical transmitters and receivers required to link a single tree are located along a linear array in a plane, a parallel duplication for each row and column results in an optical MCT topological layout. Most intermediate nodes communicate with three nodes, at three different angles where two of the angles are symmetric.

Figure 4:
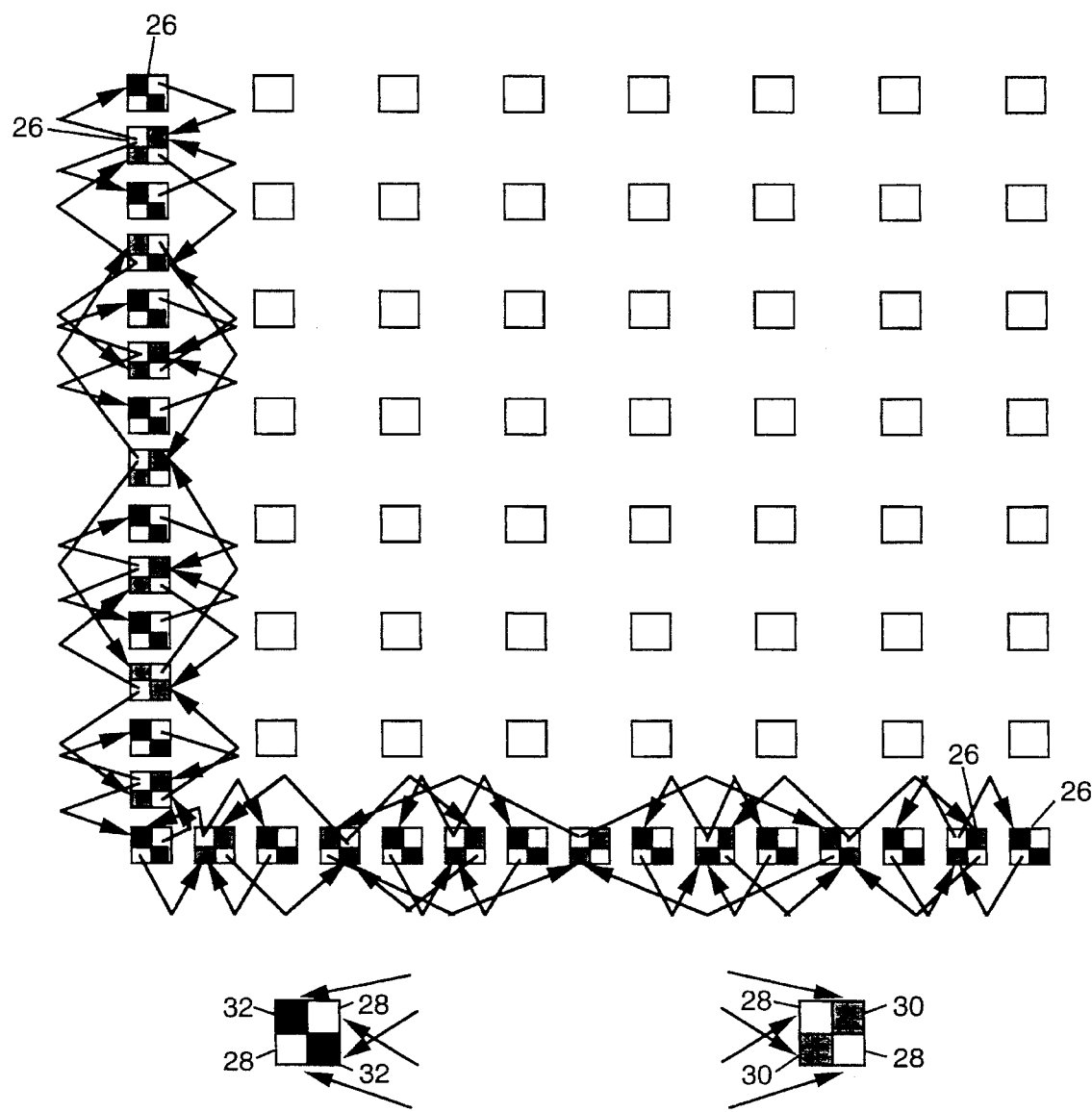
FIG. 4 is a schematic representation of a preferred embodiment of an optical transmitter/receiver layout.

FIG. 4 shows a preferred embodiment of an optical transmitter/receiver arrangement. Pairs of optical transmitter/receivers 26 in alternating positions are used at each node in order to assure symmetric beam hopping distances. For simplicity only one row and one column is shown in detail.

In order to implement a degree-3 node, three pairs of transmitters and receivers are required. Since the MCT topology is a 2D symmetric topology, it is difficult to define a space-efficient layout for the six optical pixels in a 2D symmetrical layout. Therefore, in a preferred embodiment, each node contains four optical pixels in a 2×2 arrangement. In FIG. 4, the "empty" pixels 28 represent transmitters, the "shaded" pixels 30 represent leaf nodes and the "solid" pixels 32 represent other nodes. Using this configuration, the fan-out or fan-in per pixel is reduced to two. In order to assure that the fan-out and fan-in signals form symmetric angles, the 4-pixel node layout pattern for the entire MCT network can be arranged as shown in FIG. 4, where the leaf nodes pattern orientation and the orientation of successive "parent" nodes alternate to assure symmetric illumination angles and hopping distances.

Figure 5:
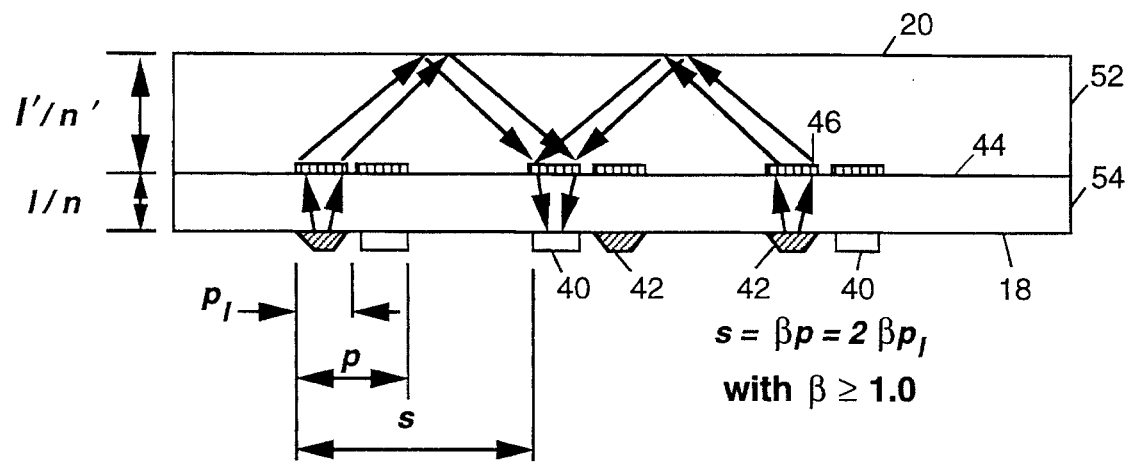
FIG. 5 is a cross-sectional profile of a preferred embodiment of a planar optical cavity.

The present invention is based on the so-called transmissive-reflective planar optical scheme such as is described by J. Jahns and B. Acklin, supra. FIG. 5 shows in cross-sectional profile a preferred embodiment of a portion of a planar optical cavity. The selection of a destination node 40 is made by pixel electronics (not shown) associated with each transmitter node 42. The switched signals are transmitted from transmitter 42, upward in the vertical direction in the orientation shown in FIG. 5, toward plane reflector 20 where the signal is reflected toward a predetermined destination optical receiver 40. In order to guide a signal from a transmitter 42 to its destination optical receiver 40 in a single hop, an interface 44 at which a linear array of collimating/deflecting planar optical components 46 is required. The space between plane 18 and reflector 20 is therefore filled with two layers 52, 54 of optically transparent material. The layer 52 is of length l' and has an index of refraction n'. The layer 54 has a length l and an index of refraction n. Preferred materials for the layers 52, 54 are glass and quartz. The layers may comprise the same or different materials. While it will be apparent to those skilled in the art that reflective planar optical components can be located at the plane reflector 20, the embodiment shown in FIG. 5 which includes two layers 52, 54 meeting at interface 44, delivers a superior result in terms of space utilization efficiency. The reason is that the distance a diverged optical signal must travel before reaching a collimating optical component is less in the embodiment shown using a transmissive optical component compared to an embodiment using a reflective component.

In order to better understand the invention, certain geometric parameters must be defined. The distance l is the distance between the node splitting plane 18 and the array of transmissive optical components at interface 44 (the length of layer 54). The refractive index of the medium comprising layer 54 disposed between plane 18 and the array of transmission optical components at interface 44 is denoted n and the refractive index of the medium comprising layer 52 between plane reflector 20 and interface 44 is denoted n'. The distance l' is the distance between the plane reflector 20 and the interface 44 (the length of layer 52). The linear dimension of a transmitter 42 is $p_t$ and the linear dimension of a receiver is $p_d$, where $p=p_t+p_d$. The value s is the linear distance between nodes. The value $\beta=s/p$ is a spacing parameter, where $\beta \geq 1$. As a result of using a 2×2 pixel arrangement instead of a 3×3 pixel arrangement for each node, the simultaneous signal transmissions from an intermediate tree node to the tree nodes directly below must be used. In order to determine which signals are to be received, methods commonly employed in communication protocols may be used to identify the correct signal.

The planar array of transmissive micro-optical component 46 is the most difficult component to design and fabricate when implementing a planar optical MCT network as will be described below. The planar reflector 20 comprises a flat mirror. The transmitter and receiver elements along plane 18 can be fabricated precisely using current state-of-the-art VLSI processing technology.

While generally any light or laser source may be used as the transmitters, the preferred transmitters are vertical cavity surface emitting lasers (VCSEL) or vertical cavity vertical-to-surface-transmission-electro-photonic (VSTEP) lasers. The beams emitted from an array of VCSEL lasers and VSTEP lasers do not suffer from the astigmatism problems commonly associated with edge emitting lasers.

In anaylzing the performance of the MCT network, for typical beam waists of 5 to 10 μm diameter, the lasers cannot be assumed to be an ideal point source which can be collimated by a lens. Therefore, the following analysis is based on Gaussian beam assumptions which closely resemble practical situations.

Figure 6:
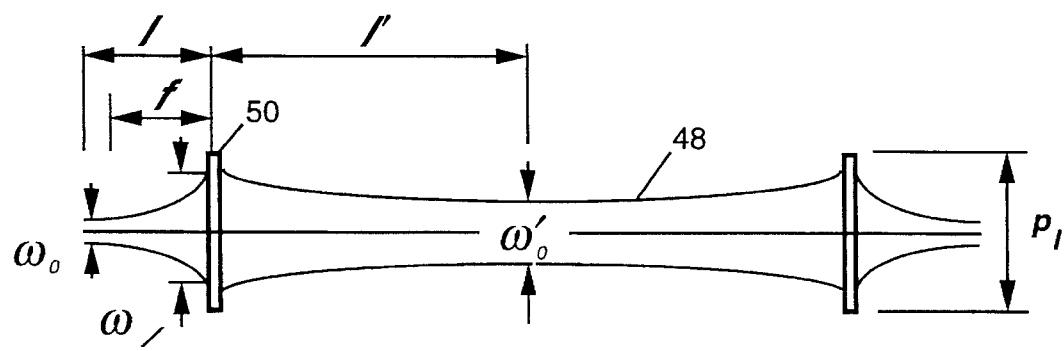
FIG. 6 is a representation of a Gaussian beam.

FIG. 6 shows a Gaussian beam 48. A major difference between a Gaussian beam and the ideal point source assumption is that in the former case there is a unique distance between the lenses while in the latter case there are an infinite number of possibilities. In FIG. 6, f is the focal length of imaging lens 50, $\omega_o$ is the Gaussian beam waist at an object, $\omega_l$ is the Gaussian beam waist at the lens and $\omega_o$, is the Gaussian beam waist at the image plane. Assuming a symmetrical design, the plane mirror 20 must be located at a distance l' from the lens plane in order to avoid misfocusing at the receiving plane. Also, the lens diameter should be greater than the propagated beam waist $\omega_l$ at the lens to assure Gaussian beam propagation conditions. Thus, the maximum deflection angle, the pixel size, and the maximum number of nodes the planar optical MCT network can interconnect are closely related to the Gaussian beam propagation conditions.

As noted above, certain nodes only perform the imaging and deflecting operations while other nodes have an additional 2-to-1 fan-in or 1-to-2 fan-out capability.

Consider the case of performing only imaging and deflecting operations. Referring to FIG. 7a, there is shown a geometry for performing imaging and deflecting using a refractive planar microlens (PML) 38. FIG. 7b is a top plan view showing the lens 38 at an off-axis position relative to the transmitter 42 for off-axis imaging.

In this case the required spacing s (FIG. 5) is $$s = \beta p = \beta(4l/n \tan\alpha + 2Y\omega_l) \qquad (1)$$

where $Y \geq 1$ is a constant and $\omega_l$ corresponds to $$\omega_l = \omega_0 \sqrt{1 + (l/z_0)^2} \qquad (2)$$

where $z_o$ is the depth of focus (Raleigh distance) of a Gaussian beam so that $$z_0^2 = \frac{\omega_0^4 \pi^2}{\lambda^2} \qquad (3)$$

where $\lambda$ is the wavelength of the light.

It has been shown that $Y \geq 1.6$ is necessary to ensure an approximate Gaussian beam propagation condition. From FIG. 3(b), the spacing s can be expressed $$s = \frac{4l'/n' \tan\alpha'}{\sqrt{N}} \qquad (4)$$

Thus, from Eqs. (1) and (4), the number of nodes in a single tree of an N node MCT is $$\sqrt{N} = \frac{2l'/l \tan\alpha'}{\beta n'/n (2\tan\alpha + n\gamma \omega_l/l)} \qquad (5)$$

As implied in Eq. (5), the MCT network array size is proportional to the imaging magnification ratio of l'/l and is almost independent of the maximum deflection angle $\alpha$ (in case of n=n' and $\alpha=\alpha'$). This relation can be understood by considering the geometries of FIG. 1 and FIG. 7(b). In order to have a large hopping distance through a single reflection, while at the same time keeping the lens diameter small, it is necessary to increase l'/n' while decreasing l/n. A planar micro-lens can be fabricated either refractively by diffusing different refractive index materials into the glass, or diffractively by etching a Fresnel zone lens on the transparent material. An off-axis refractive planar micro-lens (PML) which will be referred to as a type I component has to maintain its geometrical shape during fabrication and cannot be fabricated with only an off-axis aperture. As a result, this approach using a type I component is not space-efficient.

Alternatively, it is possible to fabricate the so-called Fresnel zone lens to achieve the deflection and imaging goal. Using this approach, the lens aperture can be designed to exclude the unused portion. It can be shown that the corresponding tree size can be increased to $$\sqrt{N} = \frac{2l' \tan\alpha'}{\beta n' \gamma \omega_l} \qquad (6)$$

In this case, the larger the deflection angle, the larger the tree size. The optical components which deliver the performance of Eq. (6) will be referred to as type II components.

The optical components for those nodes which need to perform additional fan-in or fan-out operations are more complicated. By using two cascaded components, one for an on-axis imaging operation and another for a symmetric split or combine operation, the required conditions can be satisfied. In particular, a sinusoidal phase grating can be attached to an on-axis PML to form a diffractive-refractive optical component. The imaging and splitting operations can also be fabricated in a single diffractive component. That is, either a combination of type I and II components, or only type II components can be used to perform all necessary optical signal routing operations. An advantage of using only type II components is that a more space-efficient layout can be achieved. A disadvantage with the type II components, however, is the larger optical power loss than the type I components.

For a Gaussian beam, the object and imaging distances are related by $$l' - f = M^2(l - f) \qquad (7)$$

where f is the lens focal length and M is a magnification factor, and $$M^2 = \frac{f^2}{(l-f)^2 + z_0^2} \qquad (8)$$

Solving for the ratio of l'/l $$l'/l = \frac{(x-1) + (x-1)^2 + x_0^2}{x[(x-1)^2 + x_0^2]} \qquad (9)$$

where $$x = l/f \text{ and } x_0 = z_0/f. \qquad (10)$$

Figure 8:
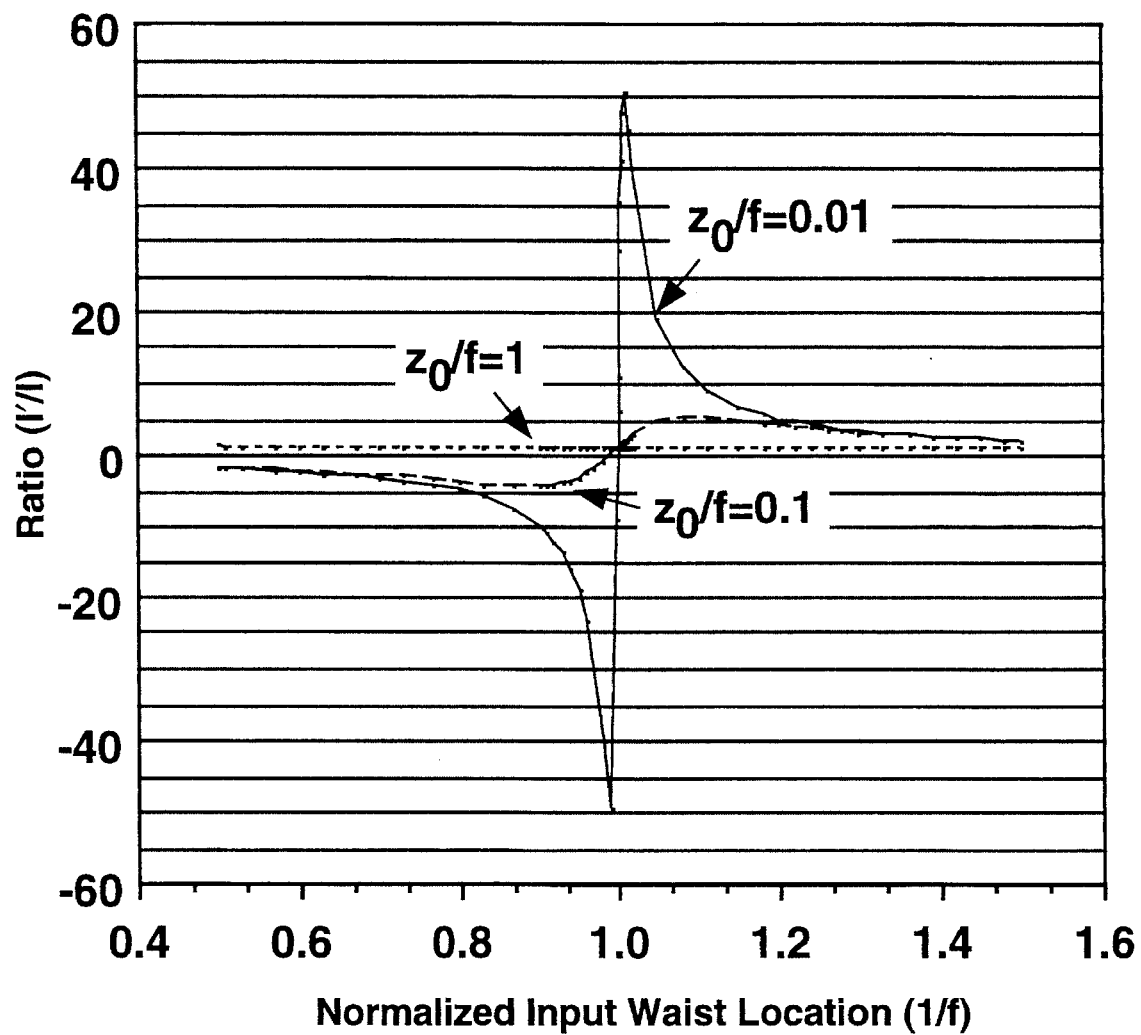
FIG. 8 is a graph of the magnification ratio of a Gaussian beam as a function of the input beam waist location.
Figure 9:
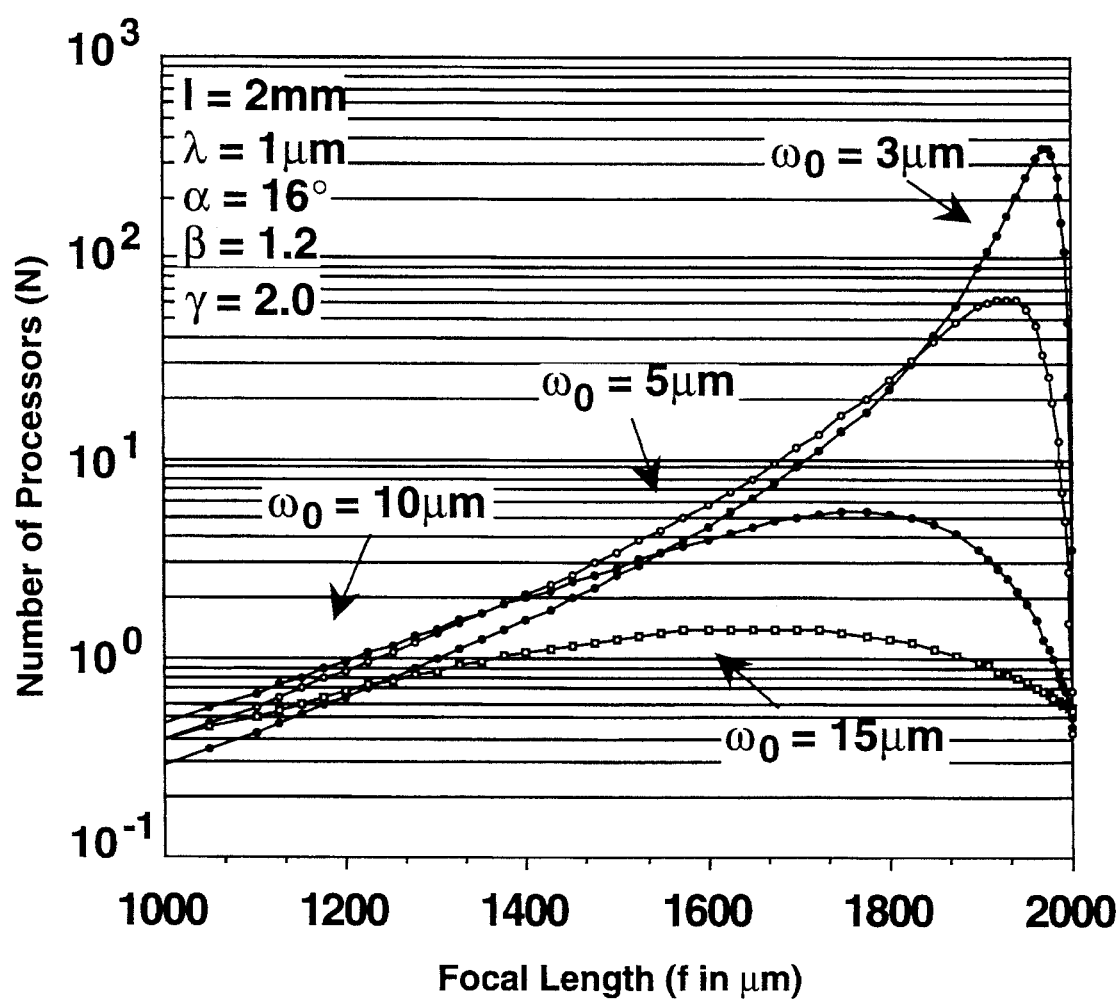
FIG. 9 is a graph of interconnect capacity (maximum number of nodes) as a function of focal length when using both type I and type II components for imaging and deflection.
Figure 10:
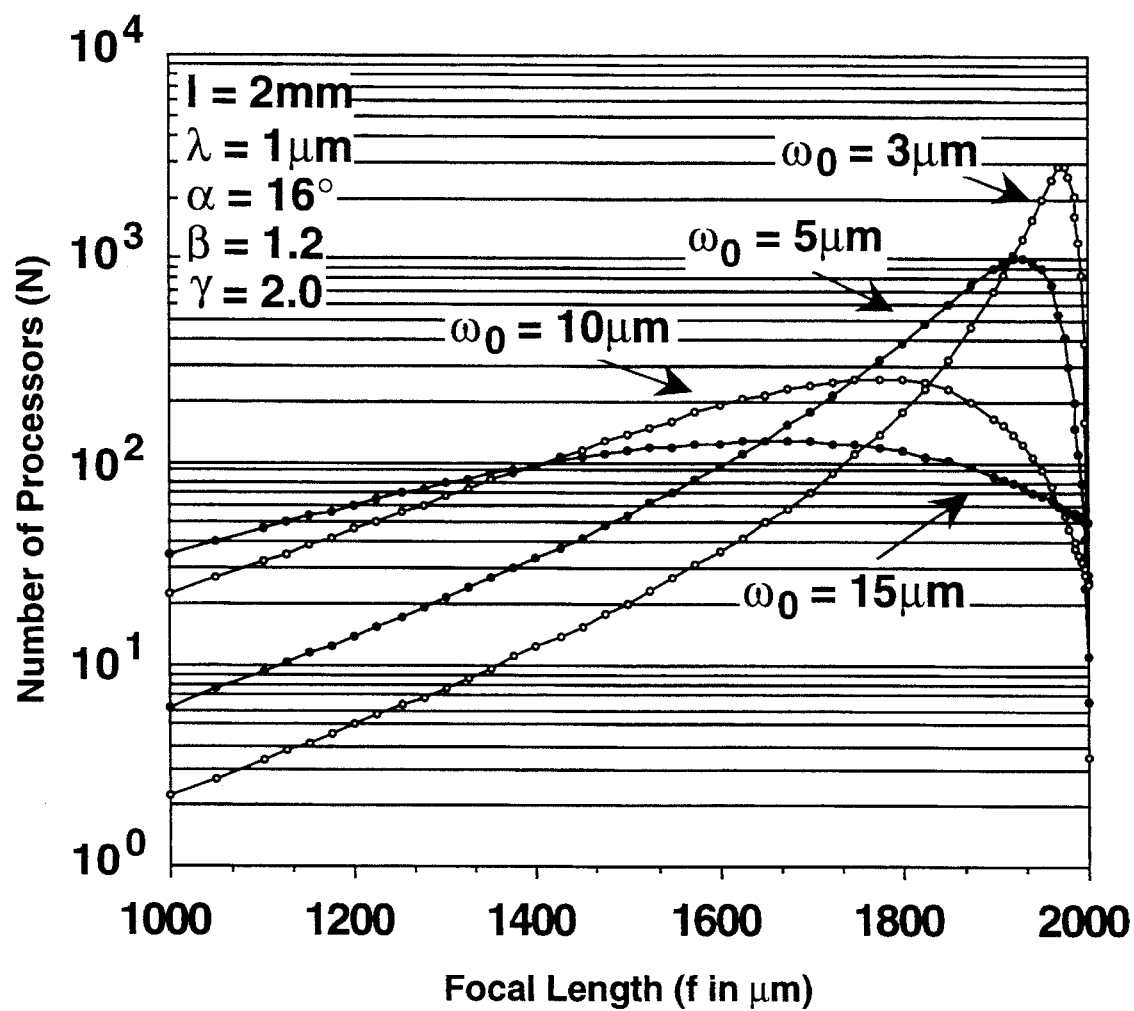
FIG. 10 is a graph of interconnect capacity as a function of focal length when using only type II component for imaging and diffraction.
Figure 11:
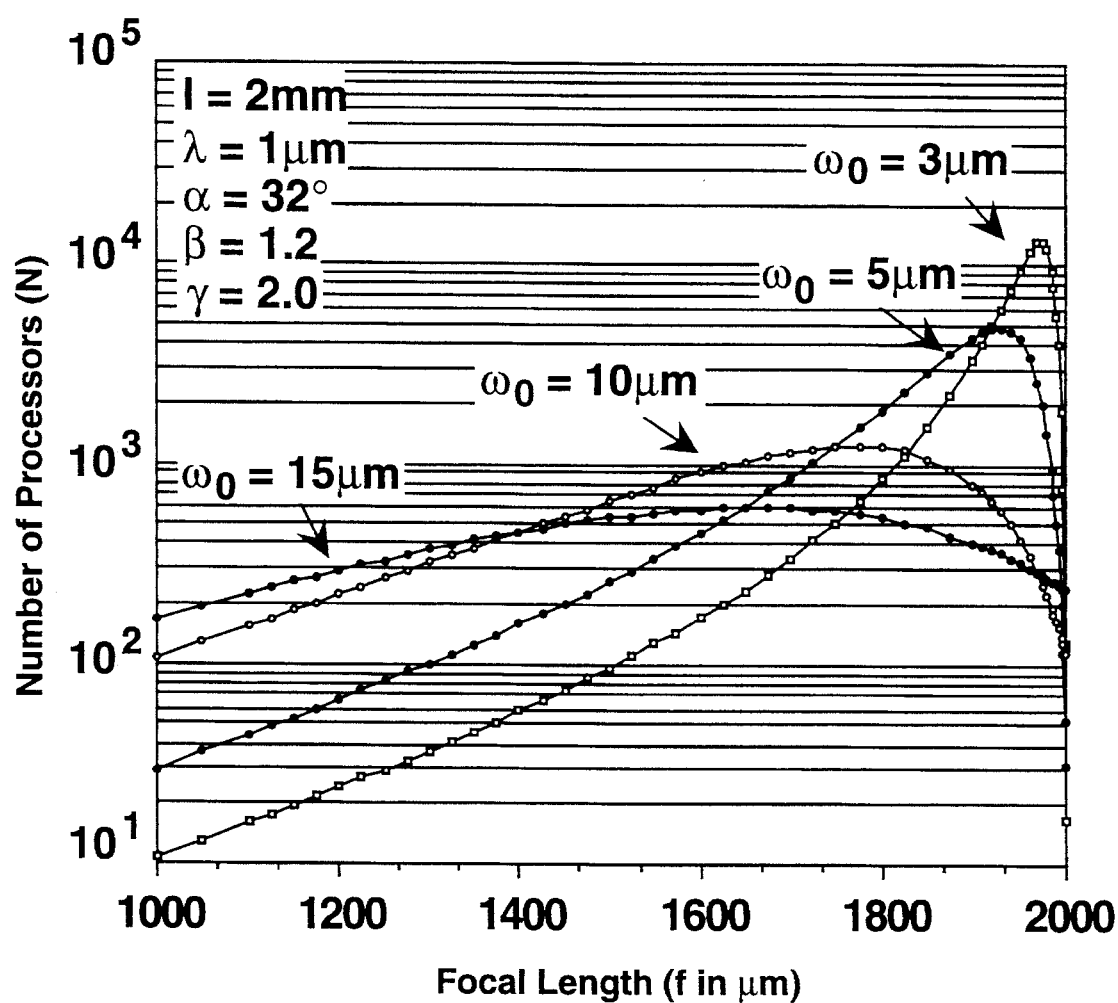
FIG. 11 is a graph of interconnect capacity as a function of focal length when using type II components for imaging and diffraction but with different maximum angle, $\alpha$, than that in FIG. 10.

Eq. (9) is plotted in FIG. 8 with $x_0$ as a parameter. In order to obtain a large l'/l ratio, two conditions must be met simultaneously. First, the lens has to be placed with its object distance slightly larger than the focal length, and, second a combination of a small Raleigh distance as well as a large focal length must be used. For a fixed wavelength, this requires a transmitter having a small beam waist. Using the results shown in FIG. 8 and the following assumptions: n=n'=1.5, l=2 mm, $\lambda=1$ µm, $\alpha=16°$, $\beta=1.2$, and $\gamma=1.6$, the maximum numbers of leaf nodes in a MCT network are shown in FIGS. 9, 10 and 11. In FIG. 9 the interconnect capacity (maximum number of nodes) as a function of focal length is shown when using both type I and II components for imaging and deflection. FIGS. 10 and 11 show the interconnect capacity as a function of local length when only the type II components are for imaging and deflection. The only difference in conditions between the graphs in FIG. 10 and FIG. 11 is that the deflection angle used for the situation of FIG. 11 is 32°, which is twice the 16° angle for the situation in FIG. 10. Using the type II components, the device spacing is independent of the employed deflection angle. This independence allows an increase in the interconnect capacity by using a large deflection. In each of the graphs in FIGS. 9, 10 and 11, the emitted beam waists of 3 µm, 5 µm, 10 µm, and 15 µm were assumed. A detailed summary of the design configurations is also presented in the Table, where F/# denotes the ratio of the corresponding focal length and the effective lens aperture, and D is the linear dimension of the entire MCT array. When both type I and type II components are used, the interconnect capacity is very limited. However, when only type II components are employed, interconnect capacity of up to 4,096 nodes can be accommodated with the use of a typical 5 μm spot size laser array. With this approach, MCT interconnects of more than $10^4$ nodes are possible although such data is not included in the Table.

| Items | Parameters for the Planar Optic MCT Design | | | | | | | |
|---|---|---|---|---|---|---|---|---|
| | $\omega_0$ | N | l'/n' | f | α | $P_1$ | F/# | D |
| using type I & II components | $5 \times 10^{-3}$ | 64 | 17.066 | 1.860 | 16° | 1.020 | 1.82 | 36.72 |
| | $3 \times 10^{-3}$ | 256 | 39.810 | 1.951 | 16° | 1.190 | 1.64 | 88.54 |
| Using only type II components | $10 \times 10^{-3}$ | 256 | 4.352 | 1.775 | 16° | 0.130 | 14.3 | 9.762 |
| | $10 \times 10^{-3}$ | 1,024 | 3.988 | 1.650 | 32° | 0.130 | 12.7 | 19.66 |
| | $5 \times 10^{-3}$ | 1,024 | 17.41 | 1.935 | 16° | 0.260 | 7.7 | 39.31 |
| | $5 \times 10^{-3}$ | 4,096 | 15.88 | 1.882 | 32° | 0.260 | 7.2 | 79.25 |

(Units are all in mm. The following parameters were also assumed:
1 = 2 mm, λ = 1 μm, β = 1.2, γ = 2.0.)

An optical MCT network built in accordance with the teachings of the present invention preferably includes a VSTEP laser family of transmitters and receivers. Using VSTEP technology current state-of-the-art results in fabrication of 5 μm features size optical transmitter array, however, the following example uses 10 μm feature size. To design an interconnecting network of, for example, 1024 processors using 10 μm VSTEP lasers according to the data in Table 1, a planar cavity having an area of not more than 2×2 cm² is sufficient when the maximum deflection angle is 32°. Each microlens has a diameter of approximately 130 μm. The total thickness of that glass plate is approximately 4 mm resulting in an optical network which is both extremely compact and rigid.

FIG. 12 is a cross-section profile of a preferred planar optical network using only type II components. Two flat glass or other low absorption transparent material plates 56, 58 are used to sandwich the planar array of transmissive micro-optical components 60. In order to provide fan-in or fan-out operation, the corresponding locations on the top surface 62 of the lower plate 58 are fabricated with on-axis PMLs. The bottom surface 64 of the top plate 56 is etched to form a series of gratings 66 and the top surface 62 of the bottom plate 56 contains small lenses 68 in order to form two types of diffractire optical components. There are lenses 68 (not shown) associated with each grating 66.

That is, at locations directly opposite PML 68, 1-to-2 beam splitting phase gratings 66 are fabricated. At other locations off-axis deflection and imaging freznel zone lense (FZL) are fabricated. Any light transmission passes through a beam splitting element only once at either the transmitter or receiver portion of the node.

In operation a transmitter element 42 transmits a pulse of optical energy through lens 68 and grating 66 where the pulse is deflected to reflector plane 20. In the case of a parent node transmitter node, the angle of incidence at the plane 20 is such that the pulse is reflected toward the two adjoining child node receiver nodes 40 after passing through different respective gratings 66 and lenses 68 (not shown). Conversely, a transmit node 42 at a leaf node transmits a pulse of optical energy through lens 68 and grating 66 to reflection plane 20 where the pulse is reflected to the receiver node of the parent node after passing through an associated grating 66 and lens 68. By selective positioning of the transmitter and receiver nodes relative to an associated lens 68 and grating 66 combination and by selective fabrication of the lens 68 and grating 66 themselves in conjunction with selecting the mediums 56, 58 and the dimensions thereof, the angles necessary to hop between pairs of nodes 10 and the associated node 12, and pair of nodes 12 and the associated node 14, and pair of nodes 14 and the associated root node 16 (see FIG. 1) can be achieved resulting in a planar optical mesh-connected tree topology interconnect network forming the present invention.

PML can perform on-axis as well as off-axis imaging and beam collimating. In order to be a more useful component in the planar MCT network, the PML is fabricated and located at a position for imaging the light signal from the VSTEP laser transmitter to a point as far away from the PML as possible. Preferably this is accomplished by means of a small flat lens. A PML having a diameter of 250 μm and a focal length of 560 μm, resulting in a numerical aperture of approximately 0.22, was fabricated. The light emitting area was approximately 80 percent of the PML area. The PML substrate thickness was selected so that the distance between the VSTEP laser and the PML surface was slightly larger than the focal length. The PML substrate was attached to the VSTEP laser by means of a light sensitive adhesive. The results indicated that it was possible to use the PML to transmit light signals a distance of approximately 20 mm without encountering significant problems.

In another experiment, micro MZLs having a diameter and numerical aperture of 250 μm and 0.34 respectively were used. The on-axis FZL array was fabricated directly on a GaAs substrate. Results indicated that a near diffraction limit performance can be expected from such a FZL. In order to achieve the beam deflection task using the diffractlye means, either off-axis FZLs have to be fabricated or a second layer of simple beam-splitting gratings are required.

The power loss associated with beam propagation between a transmitter and a receiver in this planar cavity is estimated as follows. First, the light generated by or terminated at a VSTEP device has to pass through a GaAs substrate 70. Depending on the emitting wavelength of the VSTEP pixel, GaAs material has an absorption constant in the range of 20 cm$^{-1}$ to 30 cm$^{-1}$. Using a reasonable substrate thickness of 100 μm and taking a typical absorption constant of 25 cm$^{-1}$, the power loss incurred upon penetrating the GaAs layer will be about 23% or 1.0 dB. In the emitting wavelength range of a VSTEP device, GaAs material has a refractive index of about 3.5. The difference of refractive indices between the GaAs substrate and the glass material in layer 58 corresponds to a power transmission ratio of $4n_1n_2/(n_1+n_2)2=0.84$, or equivalently, a power loss of 0.75 dB. Since the glass or quartz plate 58 will preferably be flip-chip bonded to the GaAs substrate, it is possible to apply an antireflection coating at the interface. Thus, assume the reflection loss here will be controlled below 0.45 dB. Absorption loss inside a glass material is negligible for the given propagation distance, and the transmissive loss at the top glass-air reflecting interface can be minimized through coating to under 4.5% or 0.2 dB. The only significant power loss is the loss occurring at the transmissive micro-optical component 66, 68. Assume the emitted beam will first pass through an off-axis FZL 68 which deflects the beam without splitting, and then pass through a second micro-optical component 66 which has a 1to-2 splitting phase-grating and an on-axis PML. A FZL usually has an efficiency much lower than either a PML or a beam-splitting grating. Assume that the total loss when passing through the FZL is about 40% or 2.2 dB. For the component with 1to-2 splitting, assume that the beam splitting grating has a loss of 12% and the PML has a loss of 4%. To incorporate a fundamental 50% power splitting, the entire component contributes to a total 3.7 dB loss. The estimate is somewhat conservative since recently using the so-called segmented ratio partition scheme, some off-axis computer-generated FZL type holograms on quartz material have been reported to have diffraction efficiency up to 89.2%. Using the above estimated power loss data, an optical power distribution with an additional 1.0 dB safety margin is provided to assure correct detection. Therefore, a total of 10 dB power loss has been estimated for an optical signal to complete a single pass from a transmitter to a receiver.

With a 10 dB power loss budget, the total system power consumption can be estimated based on current VSTEP laser devices. A VSTEP pixel can currently be modulated at 800 Mb/s speed with an overall electric-to-optic conversion efficiency greater than 10%. However, its optical switching energy is about 2.2 pJ making it a low sensitivity light detector. To improve the light detection sensitivity, an integrated type VSTEP device comprising of a pnpn-VSTEP and a heterojunction photo-transistor (HPT) can be used at rates up to 200 Mb/s with a switching energy of 50 fJ. At a rate of 200 Mb/s the required optical power is 10 µW which in turn generates a photo current of 10 µA. At a gain of 100, a current of 1 mA will flow into the HPT. At the driving voltage of 1.5V, the HPT draws an electric power of 1.5 mW. When the 1 mA current flows through the subsequent pnpn-VSTEP which is driven at 2V, another 1 mW is consumed (assuming a 50/50 splitting of "0" and "1" bits), making a total electric power consumption of 2.5 mW at the receiver side. At the transmitter side, to supply sufficient optical power to cover the 10 dB optical loss, 100 µW optical power is needed. A 10% electric-to-optic conversion efficiency then makes a VSTEP transmitter working at 200 Mb/s, a total electric power consumption of 1 mW. Thus, a pair of VSTEP transmitter/receiver will consume about $P_E$=3.5 mW total electric power at the 200 Mb/s data rate, without counting for the power consumption of other supporting electronics. An N node MCT would then draw a total peak electric power density of $$PT = \frac{2P_E(3N - 2\sqrt{N})}{D^2} . \tag{11}$$

A factor of two appears because each node has two pairs of transmitter and receiver. Using the data presented in Table 1, N=1,024, a total peak electric power of 21 W corresponds to a power density of 5.5 W/cm² using an $\omega_0$=10 µm VSTEP. Such a power density presents problems for cooling. But, this power density drops to about 1.4 W/cm² using the $\omega_0$=5 µm VSTEP which provides for longer distances between nodes, thereby allowing conventional convection cooling. In the case of N=4,096, a peak power consumption of 86 W can be distributed in an area of about 64 cm² so that its power density will not exceed more than 1.4 W/cm². The inclusion of other switching electronics will add additional power consumption to the chip. Based on the data in Table 1, a node which contains two pairs of transmitters and receivers has a total space of about 315×315 µm² for $\omega_0$=10 mm, and about 630×630 mm² for $\omega_0$=5 µm. This space is capable of housing a moderate amount of electronic circuitry needed to support switching logic. In either case, conventional forced air cooling should be sufficient.

The use of diffractive optical components introduces a dispersion problem. The wavelength emitted from a VSTEP array may not be uniform because of variations in the semiconductor processing. FZL has a transmission function g(x)

$$g(x) = \exp(j2\pi\xi x) = \exp\left(\frac{j\pi x^2}{\lambda f}\right) \tag{12}$$

where ξ is the instantaneous spatial frequency at x and $$\xi = \frac{x}{\lambda f} = \frac{\theta}{\lambda} \tag{13}$$

with θ being the deflection angle. The FZL angular inaccuracy caused by the wavelength inaccuracy is then $$\frac{\Delta\theta}{\theta} = \frac{\Delta\lambda}{\lambda} \tag{14}$$

Using the above planar optical geometry, the deflected beam arrives at the second micro-lens location with a dispersion-caused spatial shift Δx. Although the second micro-lens will correct the angular shift, a net spatial shift may result in a misfocus at the receiver. Assume that the receiver has a linear width of $x_d$, it can then be shown that a detection bandwidth requires that $$\frac{\Delta\lambda}{\lambda} \leq \frac{x_d \cos^2\theta_{max}}{2\theta_{max}(l/n')} . \tag{15}$$

For a 200 Mb/s receiver, $x_d$ may not be larger than 100 µm. Using the obtained data in Table 1 for the case of N=1,024, this wavelength inaccuracy ratio has to be controlled within 1.6% (Δλ=16 nm) for using the combination of $\omega_0$=10 µm and α=32° and within 0.8% (Δλ=8 mn) for the combination of $\omega_0$=5 µm and α=16°.

While there has been described and illustrated a planar optical mesh-connected tree topology interconnect network, it will be apparent to those skilled in the art that variations and modifications are possible without deviating from the broad principles and spirit of the present invention which shall be limited solely by the scope of the claims appended hereto.

What is claimed is:

1. A planar optical mesh-connected tree interconnect network comprising:

a planar array of mesh-connected leaf nodes, each leaf node comprising an optical transmitter means and an optical receiver means;

parent nodes, each parent node being disposed in the plane of said planar array and intermediate an associated pair of leaf nodes, each parent node comprising optical transmitter means and optical receiver means, said parent nodes being associated with leaf nodes in accordance with a mesh-connected tree structure;

means for causing transmitter means of a preselected leaf node or preselected parent node to transmit an optical signal to receiver means at a predetermined leaf node or predetermined parent node after reflection at a reflecting plane for communicating between said preselected node and said predetermined node; and an array of micro-optical means disposed in the path of said optical signal, where a first layer of material is disposed between said nodes and said array of micro-optical means and a second layer of material is disposed between said array of micro-optical means and said reflecting plane.

2. A planar optical mesh-connected tree interconnect network as set forth in claim 1, where said micro-optical means comprise gratings and lenses.

3. A planar optical mesh-connected tree interconnect network as set forth in claim 2, where said lenses comprise planar microlenses.

4. A planar optical mesh-connected tree interconnect network as set forth in claim 2, where said lenses comprise Freznel zone lenses.

5. A planar optical mesh-connected tree interconnect network as set forth in claim 1, where said first layer of material and said second layer of material comprise the same material.

6. A planar optical mesh-connected tree interconnect network as set forth in claim 1, where said first layer of material and said second layer of material comprise different materials.

7. A planar optical mesh-connected tree interconnect network as set forth in claim 1, where said first layer of material and said second layer of material are selected from the group consisting of glass and quartz.

8. A planar optical mesh-connected tree interconnect network as set forth in claim 1, where said transmitter means comprise vertical cavity surface emitting lasers.

9. A planar optical mesh-connected tree interconnect network as set forth in claim 1, where said transmitter means comprise vertical cavity vertical-to-surface-transmission-electro-photonic devices.

10. A planar optical mesh-connected tree interconnect network as set forth in claim 1, where said leaf nodes and said parent nodes are fabricated by VLSI processing technology.

11. A planar optical mesh-connected tree interconnect network comprising:

a planar substrate comprising a linear array of mesh-connected leaf nodes, each leaf node comprising optical transmitter means and optical receiver means, and parent nodes, each parent node being disposed intermediate an associated pair of leaf nodes in accordance with a tree structure, each parent node comprising optical transmitter means and optical receiver means;

a first layer of material having a first surface in juxtaposition with said planar substrate;

mirco-optical means disposed at an oppositely disposed surface of said first layer of material; and a second layer of material having at a first surface additional micro-optical means, said second layer of material being disposed in juxtaposition with said first layer so that said micro-optical means and said additional micro-optical means are disposed in predetermined relation with respect to each other, an oppositely disposed surface of said second layer comprising a reflecting surface whereby said leaf nodes and then said parent nodes are disposed for causing an optical signal transmitted from optical transmitter means of a preselected node to traverse said first layer of material, said micro-optical means, said additional mirco-optical means, said second layer of material and be reflected at said reflecting surface, traverse said second layer of material, said additional micro-optical means, said micro-optical means, said first layer of material and be received at optical receiver means of a predetermined node.

12. A planar optical mesh-connected tree interconnect network as set set forth in claim 11, where said leaf nodes and said parent nodes comprise vertical cavity surface emitting lasers.

13. A planar optical mesh-connected tree interconnect network as set forth in claim 11, where said leaf nodes and and said parent nodes comprise vertical cavity vertical-to-surface-transmission-electro-photonic devices.

14. A planar optical mesh-connected tree interconnect network as set forth in claim 11, which said micro-optical means and said additional micro-optical means comprise lenses and gratings.

15. A planar optical mesh-connected tree interconnect network as set forth in claim 14, wilere said lenses comprise planar microlenses.

16. A planar optical mesh-connected tree interconnect network as set forth in claim 14, where said lenses comprise Freznel zone lense.

17. A planar optical mesh-connected tree interconnect network as set forth in claim 14, wilere said first layer of material and said second layer of material are selected from the group consisting of glass and quartz.

18. A planar optical mesh-connected tree interconnect network as set forth in claim 14, where said leaf nodes and said parent nodes are disposed for symmetric transmitted optical signal angles and hopping distances between said preselected node and said predetermined node.

19. A planar optical mesh-connected tree interconnect network as set forth in claim 14, where said leaf nodes and said parent nodes are fabricated by VLSI processing technology.

20. A planar optical mesh-connected tree interconnect network comprising:

a planar array of mesh-connected leaf nodes, each leaf node comprising an optical transmitter means and an optical receiver means;

parent nodes, each parent node being disposed in the plane of said planar array and intermediate an associated pair of leaf nodes, each parent node comprising optical transmitter means and optical receiver means, said parent nodes being associated with leaf nodes in accordance with a mesh-connected tree structure; and means for causing transmitter means of a preselected leaf node or preselected parent node to transmit an optical signal to receiver means at a predetermined leaf node or predetermined parent node after reflection at a reflecting plane for communicating between said preselected node and said predetermined node, where said leaf nodes and said parent nodes are disposed for symmetric transmitted optical signal angles and hopping distances between said preselected node and said predetermined node.

\* \* \* \* \*